United States Patent
Shin et al.

(10) Patent No.: US 10,536,248 B2
(45) Date of Patent: Jan. 14, 2020

(54) METHOD AND APPARATUS FOR TRANSMITTING INFORMATION RELATED TO A REFERENCE SIGNAL

(71) Applicant: Samsung Electronics Co., Ltd., Suwon-si, Gyeonggi-do (KR)

(72) Inventors: Cheolkyu Shin, Suwon-si (KR); Youngwoo Kwak, Suwon-si (KR); Hoondong Noh, Suwon-si (KR); Younsun Kim, Seongnam-si (KR); Jinyoung Oh, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/298,368

(22) Filed: Mar. 11, 2019

(65) Prior Publication Data
US 2019/0207732 A1    Jul. 4, 2019

Related U.S. Application Data

(63) Continuation of application No. 15/321,506, filed as application No. PCT/KR2016/009875 on Sep. 2, 2016, now Pat. No. 10,230,508.

(Continued)

(51) Int. Cl.
*H04L 5/00* (2006.01)
*H04J 13/00* (2011.01)
(Continued)

(52) U.S. Cl.
CPC .......... *H04L 5/0048* (2013.01); *H04J 13/004* (2013.01); *H04W 72/0406* (2013.01); *H04B 7/0452* (2013.01)

(58) Field of Classification Search
CPC .................. H04L 5/0048; H04W 72/0406
See application file for complete search history.

(56) References Cited

U.S. PATENT DOCUMENTS

| | | | | |
|---|---|---|---|---|
| 2011/0176517 | A1* | 7/2011 | Hu | H04L 5/0026 370/335 |
| 2011/0274197 | A1* | 11/2011 | Zhu | H04L 1/0031 375/267 |

(Continued)

FOREIGN PATENT DOCUMENTS

| | | |
|---|---|---|
| CN | 102237961 A | 11/2011 |
| CN | 102742176 A | 10/2012 |

(Continued)

OTHER PUBLICATIONS

Chinese Office Action dated May 23, 2019, issued in Chinese Application No. 201680051155.5.

(Continued)

*Primary Examiner* — Kashif Siddiqui
(74) *Attorney, Agent, or Firm* — Jefferson IP Law, LLP

(57) ABSTRACT

Methods and systems for converging a 5th-Generation (5G) communication system for supporting higher data rates beyond a 4th-Generation (4G) system with a technology for Internet of Things (IoT) are described. Aspects may be applied to intelligent services based on the 5G communication technology and the IoT-related technology, such as smart home, smart building, smart city, smart car, connected car, health care, digital education, smart retail, security and safety services. A method according to an embodiment includes: receiving control information; obtaining information related to the orthogonal cover code (OCC) length, based on the received control information; and receiving a reference signal, based on the information related to the OCC length. A system according to an embodiment includes, a base station that transmits information related to (Continued)

a reference signal to a terminal, and a terminal that receives the reference signal based on the received information, thereby improving the performance of channel estimation.

16 Claims, 8 Drawing Sheets

Related U.S. Application Data

(60) Provisional application No. 62/311,622, filed on Mar. 22, 2016, provisional application No. 62/214,569, filed on Sep. 4, 2015.

(51) Int. Cl.
*H04W 72/04* (2009.01)
*H04B 7/0452* (2017.01)

(56) References Cited

U.S. PATENT DOCUMENTS

| | | | |
|---|---|---|---|
| 2012/0163335 A1* | 6/2012 | Chung | H04L 5/0023 370/330 |
| 2013/0242949 A1 | 9/2013 | Hu et al. | |
| 2014/0057640 A1 | 2/2014 | Nagata et al. | |
| 2014/0112220 A1 | 4/2014 | Kwak et al. | |
| 2014/0153488 A1* | 6/2014 | Koivisto | H04B 1/10 370/328 |
| 2014/0229210 A1 | 8/2014 | Sharifian et al. | |
| 2014/0328329 A1 | 11/2014 | Novlan et al. | |
| 2014/0369286 A1* | 12/2014 | NohH04W | H04W 72/1289 370/329 |
| 2015/0049704 A1 | 2/2015 | Park et al. | |
| 2015/0304994 A1 | 10/2015 | Kim et al. | |

FOREIGN PATENT DOCUMENTS

| | | |
|---|---|---|
| CN | 102752083 A | 10/2012 |
| EP | 3 335 362 A | 6/2018 |
| KR | 10-2014-0052786 A | 5/2014 |
| KR | 10-2014-0078236 A | 6/2014 |
| KR | 10-2015-0020529 A | 2/2015 |
| WO | 2014/054887 A1 | 4/2014 |

OTHER PUBLICATIONS

European Office Action dated May 22, 2019, issued in European Application No. 16 842 366.3-1215.
3GPP TSG RAN WG1 Meeting #81. Samsung "Performance of FD-MIMO with DMRS Enhancement", R1-152900. Fukuoka, Japan, May 25-29, 2015.
3GPP TSG RAN WG1 Meeting #82. Samsung "Design of DCI for Additional DMRS Ports", R1-154167. Beijing, China, Aug. 24-28, 2015.
CMCC: Spec impact of additional DMRS ports, R1-154304. 3GPP TSG RAN WG1 Meeting #82 Beijing, China Aug. 24-28, 2015. Published on Aug. 23, 2018.
CMCC: DMRS design for Higher Order MU-MIMO, R1-150449. 3GPP TSG RAN WG1 Meeting #80 Athens, Greece, Feb. 9-13, 2015. Published on Feb. 8, 2015.
3rd Generation Partnership Project; Technical Specification Group Radio Access Network; Evolved Universal Terrestrial Radio Access (E-UTRA); Multiplexing and channel coding (Release 12), 3GPP Standard; 3GPP TS 36.212 V12.5.0. Published on Jun. 24, 2015.
European Search Report dated Jul. 5, 2018, issued in the European Application 16842366.3-1215 / 3346624—PCT/KR2016009875.

\* cited by examiner

METHOD AND APPARATUS FOR TRANSMITTING INFORMATION RELATED TO A REFERENCE SIGNAL

CROSS-REFERENCE TO RELATED APPLICATION(S)

This application is a continuation application of prior application Ser. No. 15/321,506, filed on Dec. 22, 2016, which issued as U.S. Pat. No. 10,230,508 on Mar. 12, 2019, and was based on and claimed priority under 35 U.S.C. § 371 of an International application number PCT/KR2016/009875, filed on Sep. 2, 2016, in the International Intellectual Property Office, the disclosure of which is incorporated by reference herein in its entirety.

FIELD OF THE INVENTION

Embodiments of the present invention are related to a method and apparatus for transmitting/receiving a reference signal in a mobile communication system. More specifically, embodiments of the present invention relate to a method and apparatus for transmitting information regarding the orthogonal cover code (OCC) length for a demodulation reference signal (DMRS) in the transmission of a communication system.

DESCRIPTION OF RELATED ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Mobile communication systems that were providing voice-based services have evolved to wireless packet data communication systems that are capable of providing high quality and high speed data services and multimedia services. To this end, the 3rd generation advanced mobile communication system by employing a multiple access scheme using multi-carriers is in the process of standardization by many standardization organizations, such as 3GPP, 3GPP2, IEEE, etc. In recent years, various mobile communication standards, such as Long Term Evolution (LTE) of 3GPP, Ultra Mobile Broadband (UMB) of 3GPP2, 802.16m IEEE, etc., have been developed to support a high quality and high speed wireless packet data transmission service on high quality and high speed, based on a multiple access scheme using multi-carriers.

The 3rd generation advanced mobile communication system, such as 3G LTE, UMB, 802.16m, etc., have employed, based on a multi-carrier multiple access scheme, various technologies, such as Multiple Input Multiple Output (MIMO) to improve the transmission efficiency, beamforming, Adaptive Modulation and Coding (AMC), channel sensitive scheduling method, etc. These technologies employ techniques that focus on transmission power via a number of antennas or adjust an amount of transmission data, depending on the channel quality, etc., and selectively transmit data to users of high channel quality, thereby improving the transmission efficiency and the system throughput. Since most of these techniques are used based on channel quality information between evolved Node B (eNB) (or Base Station (BS)) and User Equipment (UE) (or Mobile Station (MS)), the eNB or UE needs to measure the channel quality between eNB and UE. To measure the channel quality, Channel Status Indication reference signal (CSI-RS) is used. The eNB described above refers to a downlink transmitter and an uplink receiver located in a specified place. One eNB performs the transmission/reception for a number of cells. One mobile communication system includes a number of eNBs geographically distributed in an area, each of which performs the transmission/reception for a number of cells.

Therefore, in such a communication environment, a method and apparatus is required to efficiently transmit reference signals.

SUMMARY

Embodiments of the present disclosure have been made in view of the above problems, and provide: a method of transmitting/receiving information related to a dedicated reference signal in a mobile communication system and transmitting of a reference signal through the operation; and an apparatus adapted to the method.

Embodiments of the present disclosure also provide: a method of indicating the OCC length to switch between OCC=2 and OCC=4, according to conditions, in order to improve the performance of channel estimation, considering an environment where OCC of length 4 is used to support MU-MIMO via as many orthogonal transport layers as possible in the FD-MIMO system; and an apparatus adapted to the method.

In accordance with an embodiment, a method for a terminal to transmit/receive signals in a mobile communication system is provided. The method includes: receiving control information; obtaining information related to the orthogonal cover code (OCC) length, based on the received control information; and receiving a reference signal, based on the information related to the OCC length.

In accordance with another embodiment, a method for a base station to transmit/receive signals in a mobile communication system is provided. The method includes: transmitting control information; and transmitting a reference signal, based on the control information. The control information includes information related to the orthogonal cover code (OCC) length. The reference signal is transmitted based on the OCC length.

In accordance with another embodiment, a terminal of a mobile communication system is provided. The terminal includes: a transceiver for transmitting/receiving signals; and a controller for: controlling the transceiver, receiving control information; obtaining information related to the orthogonal cover code (OCC) length, based on the received control information; and receiving a reference signal, based on the information related to the OCC length.

In accordance with another embodiment, a base station of a mobile communication system is provided. The base station includes: a transceiver for transmitting/receiving signals; and a controller for: controlling the transceiver; transmitting control information; and transmitting a reference signal, based on the control information. The control information includes information related to the orthogonal cover code (OCC) length. The reference signal is transmitted based on the OCC length.

BRIEF DESCRIPTION OF THE DRAWINGS

The above and other aspects, features and advantages of the invention will be more apparent from the following detailed description, taken in conjunction with the accompanying drawings, in which.

DETAILED DESCRIPTION OF EMBODIMENTS OF THE INVENTION

Figure 1:
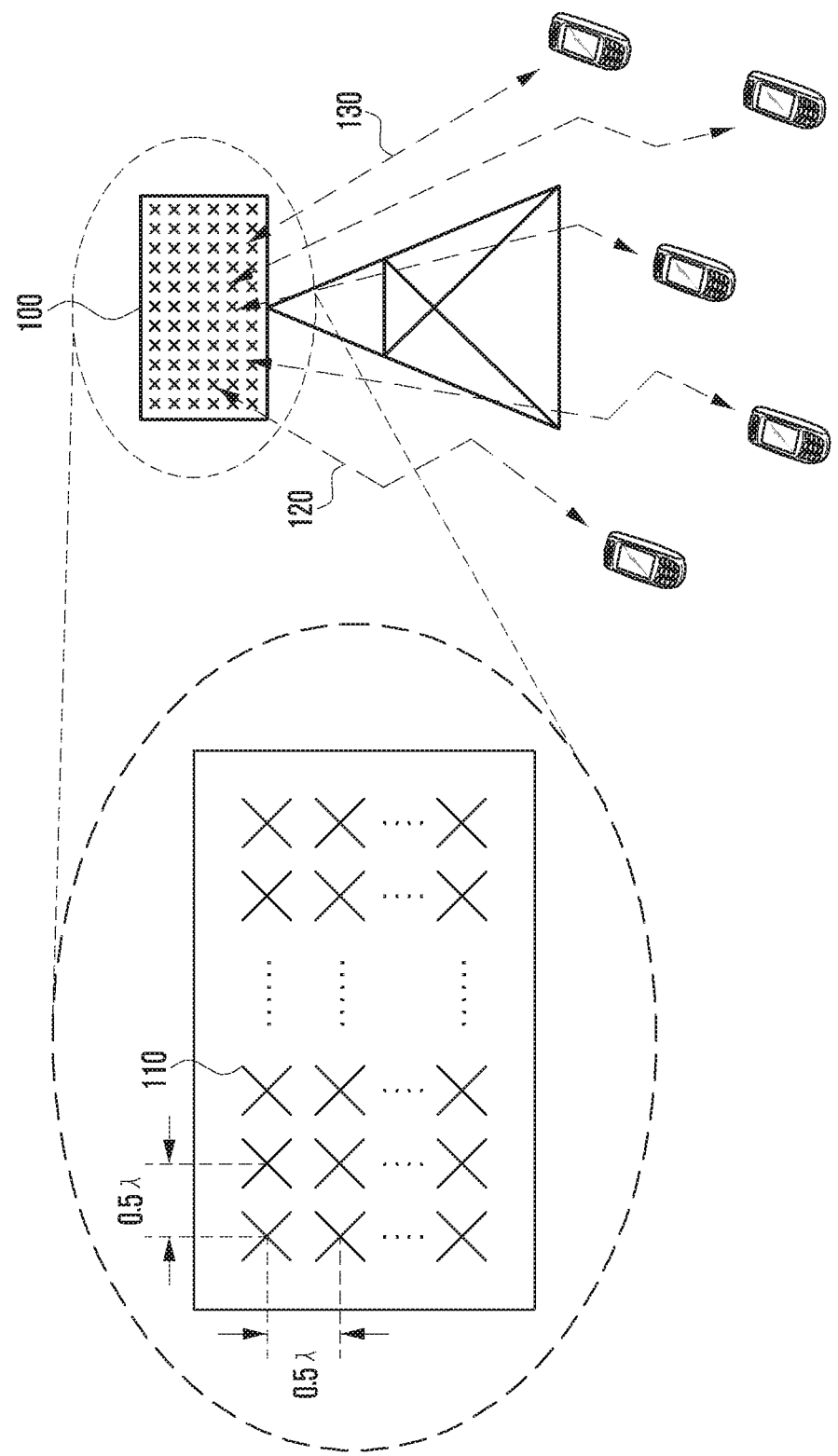
FIG. 1 is a diagram showing a Full dimension multiple-input multiple-output (FD-MIMO) system according to embodiments of the present disclosure.

Hereinafter, embodiments of the present invention are described in detail with reference to the accompanying drawings.

Detailed descriptions of well-known functions and structures incorporated herein may be omitted to avoid obscuring the subject matter of the invention.

The drawings are not necessarily to scale and certain features may be exaggerated, omitted, or simplified in order to better illustrate and explain the present invention. The same reference numbers are used throughout the drawings to refer to the same or corresponding elements.

The features and advantages of the invention and the method to achieve them will become more apparent from the following detailed description in conjunction with the accompanying drawings. However, it should be understood that: the scope of the present invention is not limited to the following embodiments but the present invention may be implemented with various modifications, additions and substitutions from the embodiments. It also should be understood that the following embodiments are merely provided to assist in comprehensive understanding of the present invention. The scope of the invention is defined in the appended claims, including the embodiments, alterations and modifications. In the drawings and description, the same elements are denoted by the same reference numbers even though they are depicted in different drawings.

It should be understood that the processes, operations, and a combination thereof in the flowcharts can be performed via computer programming instructions. These computer programming instructions can be installed to processors of: data processing equipment that can be programmed; special computers; or universal computers. The instructions, performed via the processors of data processing equipment or the computers, can generate means that perform functions described in a block (blocks) of the flowchart. In order to implement functions in a particular mode, the computer programming instructions can also be stored in a computer available memory or a computer readable recording memory that can support computers or data processing equipment that can be programmed. Therefore, the instructions, stored in the computer available memory or computer readable memory, can be installed to the products, and perform the functions therein, described in the block (blocks) of the flowchart therein. In addition, since the computer programming instructions can also be installed to computers or data processing equipment that can be programmed, they can generate processes that perform a series of operations therein, described in the block (blocks) of the flowchart therein.

The blocks of the flowchart refer to part of codes, segments or modules that include one or more executable instructions to perform one or more logic functions. It should be noted that the functions described in the blocks of the flowchart may be performed in a different order from the embodiments described above. For example, the functions described in two adjacent blocks may be performed at the same time or in reverse order.

In the embodiments, the terminology, component '~unit,' refers to a software element or a hardware element such as a PGGA, an ASIC, etc., and performs a corresponding function. It should be, however, understood that the component '~unit' is not limited to a software or hardware element. The component '~unit' may be implemented in storage media that can be designated by addresses. The component '~unit' may also be configured to regenerate one or more processors. For example, the component '~unit' may include various types of elements (e.g., software elements, object-oriented software elements, class elements, task elements, etc.), segments (e.g., processes, functions, achieves, attribute, procedures, sub-routines, program codes, etc.), drivers, firmware, micro-codes, circuit, data, data base, data structures, tables, arrays, variables, etc. Functions provided by elements and the components '~units' may be formed by combining the small number of elements and components '~units' or may be divided into additional elements and components '~units.' In addition, elements and components '~units' may also be implemented to regenerate one or more CPUs in devices or security multi-cards.

Embodiments of the present disclosure are related to general wireless mobile communication systems, and more particularly, to a method of mapping a Reference Signal in a wireless mobile communication system by employing a multiple access scheme using multi-carriers, such as Orthogonal Frequency Division Multiple Access (OFDMA), etc. In particular, embodiments of the present disclosure relate to a method of transmitting dedicated reference signals and the parameters used for the dedicated reference signals in a mobile communication system. The method according to embodiments of the present disclosure is capable of transmitting reference signals efficiently.

3G and 4G mobile communication systems, such as LTE/LTE-A, etc., have employed a MIMO technology that performs the transmission using a number of transmission/reception antennas to increase the data transmission rate and the system throughput. The MIMO technology spatially splits a number of information streams and transmits them via a number of transmission/reception antennas. Spatially separating and transmitting a number of information streams is called 'spatial multiplexing.' The number of information streams to which the spatial multiplexing is applied varies depending on the number of antennas in the receiver and the transmitter. The number of information streams to which the spatial multiplexing can be applied is called a transmission rank. In the standard up to LTE/LTE-A Release 11, the MIMO supports spatial multiplexing for eight transmission/reception antennas respectively and the rank up to a maximum of 8. The FD-MIMO system under the consideration of LTE-A Release 13 has been evolved based on an existing LTE/LTE-A MIMO and supports 8~32 or more transmission/reception antennas.

An FD-MIMO system refers to a wireless communication system that transmits/receives signals via a number of antennas. In general, an FD-MIMO system may be referred to as a wireless communication system that transmits/receives data, using tens of or more transmission antennas.

FIG. 1 is a diagram showing an FD-MIMO system according to embodiments of the present disclosure.

As shown in FIG. 1, an eNB transmission device 100 transmits wireless signals via tens of or more transmission antennas. A number of transmission antennas 110 are arranged to maintain a minimum distance between each other. The minimum distance is a half wavelength of a wireless signal to be transmitted, but is not limited thereto. When transmission antennas maintain the distance therebetween in a half wavelength of a wireless signal, the signals transmitted from the transmission antennas are affected by wireless channels that have a relatively low degree of correlation to each other. When the frequency bandwidth of transmitted wireless signals is 2 GHz, the distance is 7.5 cm. When the frequency bandwidth increases to greater than 2 GHz, the distance may be further decreased.

As shown in FIG. 1, tens of or more transmission antennas 100 arranged in the eNB may be used to transmit one or more signals 120 and 130 to one or a number of UE devices. A number of transmission antennas are capable of performing a pre-coding operation and simultaneously transmitting signals to a number of UE devices. In this case, one UE device is capable of receiving one or more information streams. In general, the number of information streams received by one UE device is determined according to the number of reception antennas of UE and the channel quality.

In order to effectively implement an FD-MIMO system, UE needs to correctly measure the magnitude of interference and the channel quality and to transmit channel status information to the eNB based on the measurement result. When receiving the channel status information, the eNB determines UE devices related to the downlink transmission, a data transmission rate, a pre-coding type to use, etc., based on the received channel status information. Since the FD-MIMO system has a number of transmission antennas, when the FD-MIMO system employs an existing method channel status information transmitting/receiving method of an LTE/LTE-A system, it may cause an uplink overhead issue that a great amount of control information needs to be transmitted via uplink.

Mobile communication systems have limitations of resources related to time, frequency, and power. Therefore, when reference signals are assigned a relatively large amount of resources, the amount of resources to be assigned to the transmission of traffic channel (data traffic channel) is reduced, and thus the absolute amount of data to be transmitted may be decreased. Although this may improve the performance of estimation and the channel measurement, the absolute amount of transmitted data is decreased, and thus this may decrease the overall system throughput. Therefore, in terms of the overall system throughput, a system is required to make a distribution between resources for reference signals and signals resources for the traffic channel transmission, in order to achieve an optimal performance.

Figure 2:
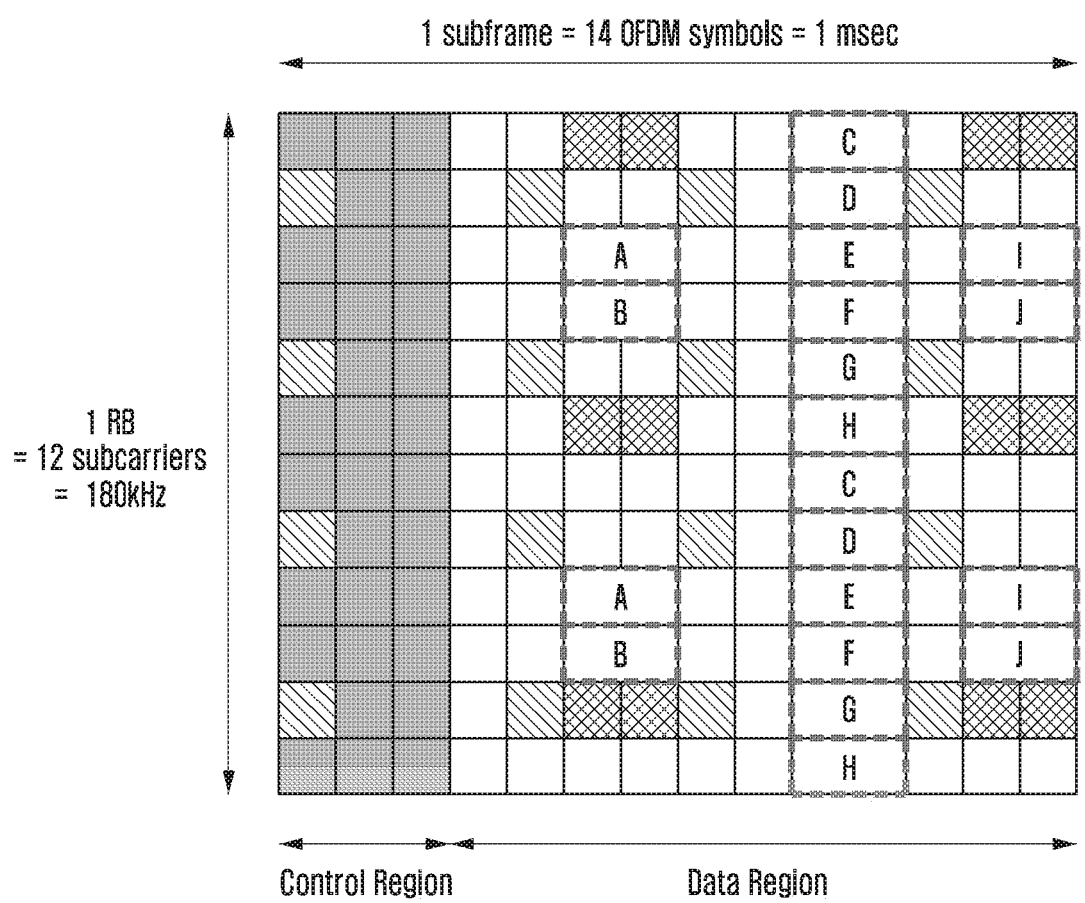
FIG. 2 is a diagram showing a wireless resource for the downlink scheduling in a communication system.

FIG. 2 is a diagram showing a wireless resource for the downlink scheduling in a communication system. More specifically, FIG. 2 is a diagram showing a wireless resource of 1 RB and 1 subframe as the minimum unit for scheduling downlink in an LTE/LTE-A system.

With reference to FIG. 2, the wireless resource is defined by one subframe in the time domain and one RB in the frequency domain. The wireless resource includes 12 sub-carriers in the frequency domain and 14 OFDM symbols, resulting in a total of 168 natural frequency-time resource positions. In LTE/LTE-A, each natural frequency-time resource position is referred to as Resource Element (RE).

As shown in FIG. 2, the wireless resource may transmit a number of different types of signals as follows.

1. Cell Specific RS (CRS): Reference Signal which is periodically transmitted for all UE devices within a cell and may be commonly used by a number of UE devices.

2. Demodulation Reference Signal (DMRS): Reference Signal which is transmitted for a specific UE device and is transmitted only when data is transmitted to a corresponding UE device. DMRS includes a total of eight DMRS ports. In LTE/LTE-A, ports 7 to 14 correspond to DMRS ports. The ports maintain the orthogonality using CDM or FDM, so as not to cause interference with each other.

3. Physical Downlink Shared Channel (PDSCH): Downlink data channel that an eNB uses to transmit traffic to UE by using REs in the data region as shown in FIG. 2, which do not transmit reference signals.

4. Channel Status Information Reference Signal (CSI-RS): Reference signal which is transmitted for UE devices within one cell and used for measurement of channel status. A number of CSI-RSs may be transmitted in a cell.

5. Other control channels (PHICH, PCFICH, and PDCCH): The channels provide control information required for UE to receive PDSCH or transmit HARQ ACK/NACK in response to the uplink data transmission.

In addition, the LTE-A system may also set a muting so that UE devices in a corresponding cell can receive CSI-RSs transmitted from the other eNB, without interference, as well as the signals described above. The muting may be set at potentially transmittable CSI-RS positions, and the UE generally skips a corresponding wireless resource to receive a traffic signal. In the LTE-A system, the term 'muting' is also called a 'zero-power CSI-RS,' which is because 'muting' is applied to 'CSR-RS positions' and does not transmit transmission power.

In the embodiment shown in FIG. 2, CSI-RSs may be transmitted by using part of the positions denoted by A, B, C, D, E, E, F, G, H, I, and J, according to the number of antennas transmitting CSI-RSs. In addition, the muting may also be applied to part of the positions, denoted by A, B, C, D, E, E, F, G, H, I, and J. In particular, CSI-RSs may be transmitted with REs of 2, 4, or 8, according to the number of transmission antenna ports. When the number of antenna ports is 2, CSI-RSs are transmitted via a half of the specified patterns shown in FIG. 2. When the number of antenna ports is 4, CSI-RSs are transmitted via all specified patterns. When the number of antenna ports is 8, CSI-RSs are transmitted via two patterns. On the other hand, the muting is formed based on a unit of one pattern. That is, the muting may be applied to a number of patterns. However, when the muting does not overlap, in position, with a CSI-RS, it cannot be applied to only part of one pattern. Only when the muting overlaps, in position, with a CSI-RS, it can be applied to part of one pattern. When CSI-RSs for two antenna ports are transmitted, the CSI-RSs transmit signals of individual antenna ports via two REs connected to each other on the time domain, and the signals of individual antenna ports are distinguished from each other, based on orthogonal codes. When CSI-RSs for four antenna ports are transmitted, the CSI-RSs for the two antenna ports and the signals for the other two antennas ports are transmitted, using the two additional REs, in the same way as the case where CSI-RSs for two antennas ports are transmitted. This is also applied, in the same way, to the case where CSI-RSs for eight antennas ports are transmitted.

As described above, a DMRS refers to a reference signal transmitted for specified UE, and is transmitted only when data is transmitted to the UE. A DMRS may include a total of 8 DMRS ports. In LTE/LTE-A, ports 7 to 14 correspond to DMRS ports. The ports maintain the orthogonality using CDM or FDM, so as not to cause interference with each other. The reference signal sequence for DMRS may be expressed by the following Equation 1.

$$r(m) = \frac{1}{\sqrt{2}}(1 - 2 \cdot c(2m)) + j\frac{1}{\sqrt{2}}(1 - 2 \cdot c(2m+1)),$$ [Equation 1]

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

Where c (i) is a pseudo-random sequence, and the initial state of a scrambling sequence for DMRS is created via the following Equation 2 for every subframe.

$$c_{init} = (\lfloor n_s/2 \rfloor + 1) \cdot (2n_{ID}^{(nSCID)} + 1) \cdot 2^{16} + n_{SCID}$$ [Equation 2]

In Equation 2, $n_s$ represents a slot index of a frame and has an integer from 0 to 19. $n_{ID}^{(nSCID)}$ and $n_{SCID}$ are values related to the DMRS scrambling. $n_{ID}^{(nSCID)}$ is a virtual Cell ID value which is an integer from 0 to 503. $n_{SCID}$ is a scrambling ID value which is 0 or 1. In LTE/LTE-A, one of the two preset values $n_{ID}^{(nSCID)}$ is determined according to $n_{SCID}$. That is, as described in the following table 1, when $n_{SCID}$ value is '0,' the virtual Cell ID value has a value, scramblingIdentity-r11, preset via the higher layer signaling. When $n_{SCID}$ value is 1, the virtual Cell ID value is a value, scramblingIdentity2-r11, preset via the higher layer signaling. The following table 1 describes the DMRS-Config configuration field.

TABLE 1

```
-- ASN1START
DMRS-Config-r11 ::=        CHOICE {
    release                    NULL,
    setup                      SEQUENCE {
        scramblingIdentity-r11     INTEGER (0..503),
        scramblingIdentity2-r11    INTEGER (0..503)
    }
}
-- ASN1STOP
```

The reference signal sequence r(m) for DMRS of Equation 1 is mapped to REs via the following Equation 3, for antenna port p=7, p=8 or p=7, 8, . . . , v+6, when PDSCH is assigned to $n_{PRB}$.

$$a_{k,l}^{(p)} = w_p(l') \cdot r(3 \cdot l' \cdot N_{RB}^{max,DL} + 3 \cdot n_{PRB} + m')$$ [Equation 3]

Where $$w_p(i) = \begin{cases} \bar{w}_p(i) & (m' + n_{PRB})\bmod 2 = 0 \\ \bar{w}_p(3-i) & (m' + n_{PRB})\bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l'\bmod 2 + 2 & \text{if in a special subframe with configuration} \\ & \text{3, 4, 8 or 9 (see Table 4.2 - 1)} \\ l'\bmod 2 + 2 + 3\lfloor l'/2 \rfloor & \text{if in a special subframe with configuration} \\ & \text{1, 2, 6, or 7 (see Table 4.2 - 1)} \\ l'\bmod 2 + 5 & \text{if not in a special subframe} \end{cases}$$

-continued $$l' = \begin{cases} 0, 1, 2, 3 & \text{if } n_s\text{mod}2 = 0 \text{ and} \\ & \text{in a special subframe with configuration} \\ & 1, 2, 6, \text{ or } 7 \text{ (see Table } 4.2-1) \\ 0, 1 & \text{if } n_s\text{mod}2 = 0 \text{ and} \\ & \text{not in special subframe with configuration} \\ & 1, 2, 6, \text{ or } 7 \text{ (see Table } 4.2-1) \\ 2, 3 & \text{if } n_s\text{mod}2 = 1 \text{ and} \\ & \text{not in a special subframe with configuration} \\ & 1, 2, 6, \text{ or } 7 \text{ (see Table } 4.2-1) \end{cases}$$

$$m' = 0, 1, 2$$

Where $w_p(i)$ is obtained by the following table 2. In the equation described above, Table 4.2-1 refers to LTE standard 3GPP TS 36.211. The following table 2 describes the sequence $\overline{w}_p(i)$ for normal cyclic prefix.

TABLE 2

| Antenna port p | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

In the table 2, the sequence $w_p(i)$ is an orthogonal cover code (OCC) for maintaining the orthogonality between DMRS ports via CDM.

In order to support MU-MIMO, the prior art supports the number of orthogonal transport layer up to a maximum of 2, using 12 DMRS REs per PRB and the OCC of a length of 2, considering only antenna port p=7, 8. The prior art supports the number of quasi-orthogonal transport layers up to a maximum of 4, using $n_{SCID}$ value. The number of layers and an antenna port transmitting a DMRS, $n_{SCID}$ using 3 bits, in the DCI format 2C and 2D, may be indicated, as in the following table 3. In the table 3, the first column refers to a case where PDSCH is scheduled by the transmission of one codeword, and the second column refers to a case where PDSCH is scheduled by the transmission of two codewords. Value=4, 5, 6 in the first column is only used for the re-transmission of a corresponding codeword. In particular, part of the corresponding information may be used to indicate DMRS information in the MU-MIMO transmission. With reference to table 3, in the MU-MIMO transmission, the current LTE standard can support the number of orthogonal transport layers up to a maximum of 2, and also the number of transport layers up to a maximum of 4, including quasi-orthogonal transport layers, when using $n_{SCID}$. The following table 3 is used for a method of indicating antenna port(s), scrambling identity and number of layers.

TABLE 3

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |

TABLE 3-continued

| One Codeword: Codeword 0 enabled, Codeword 1 disabled | | Two Codewords: Codeword 0 enabled, Codeword 1 enabled | |
|---|---|---|---|
| Value | Message | Value | Message |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

In recent years, DMRS enhancement has been discussed to increase the number of orthogonal transport layers to support MU-MIMO in FD-MIMO systems. In the following description, a method of supporting four orthogonal DMRS ports using the OCC of a length of 4 and 12 DMRS REs per PRB is explained.

As described above, in the conventional LTE specification, when the prior art defines table 3 in the DCI format 2C and 2D to support MU-MIMO, it supports: the number of orthogonal transport layers up to a maximum of 2, using 12 DMRS REs per PRB and an OCC of a length of 2, considering only antenna port p=7, 8; and also the number of quasi-orthogonal transport layers up to a maximum of 4, using $n_{SCID}$. However, when the OCC of a length of 4 is used to support the number of orthogonal transport layers up to a maximum of 4, this may cause an issue to estimate channels. The present invention provides a method of indicating the OCC length to be switched between OCC=2 and OCC=4, according to conditions, in order to improve the performance of channel estimation.

In the following description, the embodiments of the present invention will be described based on OFDM-based wireless communication systems, in particular, 3GPP EUTRA standard; however, it will be appreciated to those skilled in the art that the subject matter of the present invention can also be applied to various types of communication systems which have the technical background and channel forms similar to those of the present invention, without departing from the scope and spirit of the present invention.

As described above in the section, Background of the Invention, a method has been discussed that increases the number of orthogonal transport layers for MU-MIMO from two to four or more, through the DMRS enhancement, in FD-MIMO systems. In order to increase the number of orthogonal transport layers for MU-MIMO to four or more, OCC=4 may be used. However, it is preferable that UE operates using OCC=2, according to conditions. More specifically, when different TPs have frequency offsets that differ from each other or UE operates at a high rate during the COMP operation, UE operating with OCC=2 can improve the performance of channel estimation. The present invention provides a method of switching between OCC=4 and OCC=2, considering the conditions described above.

With reference to table 3, the method of indicating the OCC length to be switched between OCC=2 and OCC=4 is explained along with a method of displaying increased DMRS information. The method of displaying increased DMRS information may be explained based on a method of displaying DMRS information using 4 bits and a method of maintaining 3-bit information amount like an existing technology. In the following description, embodiments of the present invention describe a method of displaying increased DMRS information and a method of switching between OCC=4 and OCC=2.

Embodiment 1

In the following embodiment, a method of indicating the OCC length to switch between OCC=2 and OCC=4 is explained in order to display increased DMRS information using 4 bits. Embodiment 1 displays DMRS information using 4 bits based on the following rules. The following rules are a principle to design a DMRS table.

- Switching between OCC=2 and OCC=4 is explicitly indicated referring to a DMRS table
- In order to minimize the impact of legacy UE, in the SU-MIMO transmission, the OCC for rank 3 and rank 4 is maintained as OCC=2, like an existing OCC
- Dynamic VCID switching function is maintained as up to rank 2. Dynamic VCID switching function is useful for the CoMP operation and needs to be maintained using 4 bits. However, since the Dynamic VCID switching function for greater than rank 2 has a gain of performance which is not large, it does not support the ranks.

As such, the eNB transmits information related to the OCC length to be applied to the UE, and the UE receives reference signals based on the information. The reference signal contains DMRS.

More specifically, the number of orthogonal transport layers for MU-MIMO may be increased to 4 considering the following three cases. To support this, a method may be required to define DMRS ports.

Case 1: when the number of orthogonal transport layers for MU-MIMO is increased to 4, 4 ports are newly defined (Table 4)
Case 2: when the number of orthogonal transport layers for MU-MIMO is increased to 4, part of the ports are newly defined (Table 5)
Case 3: when the number of orthogonal transport layers for MU-MIMO is increased to 4, ports are defined using existing DMRS port numbers (Table 6)

Case 1 is a method that newly defines 4 DMRS ports. This method is considered when the OCC sequence of DMRS ports is configured in a different order from the existing sequence or is applied in a different way from an existing DMRS port and OCC length. The method can indicate the increased DMRS information and the OCC length as in the following table 4. For example, ports A, B, C, and D may also be expressed as port 7', 8', 11', and 13' in the following table 4. In table 4, ports A, B, C, and D refer to a port using OCC=4. Ports corresponding to values 0, 1, 2, 3 in the column for one codeword, or ports corresponding to values 0, 1 in the column for two codewords, refer to a port using OCC=4.

TABLE 4

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer. port 8, $n_{SCID} = 0$ | 2 | 2 layers, ports A-B, $n_{SCID} = 0$ |
| 3 | 1 layer, port 8, $n_{SCID} = 1$ | 3 | 2 layers, ports A-B, $n_{SCID} = 1$ |
| 4 | 1 layer, port A, $n_{SCID} = 0$ | 4 | 2 layers, ports C-D, $n_{SCID} = 0$ |
| 5 | 1 layer, port A, $n_{SCID} = 1$ | 5 | 2 layers, ports C-D, $n_{SCID} = 1$ |
| 6 | 1 layer, port B, $n_{SCID} = 0$ | 6 | 3 layers, ports 7-9 |
| 7 | 1 layer, port B, $n_{SCID} = 1$ | 7 | 4 layers, ports 7-10 |
| 8 | 1 layer, port C, $n_{SCID} = 0$ | 8 | 5 layers, ports 7-11 |
| 9 | 1 layer, port C, $n_{SCID} = 1$ | 9 | 6 layers, ports 7-12 |
| 10 | 1 layer, port D, $n_{SCID} = 0$ | 10 | 7 layers, ports 7-13 |
| 11 | 1 layer, port D, $n_{SCID} = 1$ | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | Reserved | 15 | Reserved |

Case 2 is a method that newly defines part of the DMRS ports. This method is considered when the OCC sequence of DMRS ports is configured in a different order from the existing sequence. When 12 DMRS REs per PRB are supported using OCC=4, a new OCC sequence needs to be defined in a different order from an existing sequence in order to resolve the power imbalance. This situation appears in ports C and D described in the following table 5. For example, as in table 4, ports C and D may be expressed as ports 11' and 13' and specified PRB may have an OCC sequence that differs from existing DMRS ports 11 and 13. In this case, in order to indicate the OCC length, the OCC length may be additionally expressed as in table 5.

TABLE 5

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$, OCC = 2 | 0 | 2 layers, ports 7-8, $n_{SCID} = 0$, OCC = 2 |
| 1 | 1 layer, port 7, $n_{SCID} = 1$, OCC = 2 | 1 | 2 layers, ports 7-8, $n_{SCID} = 1$, OCC = 2 |
| 2 | 1 layer, port 8, $n_{SCID} = 0$, OCC = 2 | 2 | 2 layers, ports 7-8, $n_{SCID} = 0$, OCC = 4 |
| 3 | 1 layer, port 8, $n_{SCID} = 1$, OCC = 2 | 3 | 2 layers, ports 7-8, $n_{SCID} = 1$, OCC = 4 |
| 4 | 1 layer, port 7, $n_{SCID} = 0$, OCC = 4 | 4 | 2 layers, ports C-D, $n_{SCID} = 0$, OCC = 4 |
| 5 | 1 layer, port 7, $n_{SCID} = 1$, OCC = 4 | 5 | 2 layers, ports C-D, $n_{SCID} = 1$, OCC = 4 |
| 6 | 1 layer, port 8, $n_{SCID} = 0$, OCC = 4 | 6 | 3 layers, ports 7-9 |
| 7 | 1 layer, port 8, $n_{SCID} = 1$, OCC = 4 | 7 | 4 layers, ports 7-10 |
| 8 | 1 layer, port C, $n_{SCID} = 0$, OCC = 4 | 8 | 5 layers, ports 7-11 |
| 9 | 1 layer, port C, $n_{SCID} = 1$, OCC = 4 | 9 | 6 layers, ports 7-12 |
| 10 | 1 layer, port D, $n_{SCID} = 0$, OCC = 4 | 10 | 7 layers, ports 7-13 |
| 11 | 1 layer, port D, $n_{SCID} = 1$, OCC = 4 | 11 | 8 layers, ports 7-14 |

TABLE 5-continued

| One Codeword: Codeword 0 enabled, Codeword 1 disabled | | Two Codewords: Codeword 0 enabled, Codeword 1 enabled | |
|---|---|---|---|
| Value | Message | Value | Message |
| 12 | 2 layers, ports 7-8 | 12 | Reserved |
| 13 | 3 layers, ports 7-9 | 13 | Reserved |
| 14 | 4 layers, pests 7-10 | 14 | Reserved |
| 15 | Reserved | 15 | Reserved |

Case 3 is a method that uses existing DMRS port numbers. This method may be employed when, although a situation where an OCC sequence needs to be changed occurs, DMRS ports may be mapped to existing DMRS port numbers to comply with the situation. In this case, in order to indicate the OCC length, the OCC length may be additionally expressed as in the following table 6.

TABLE 6

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$, OCC = 2 | 0 | 2 layers, ports 7-8, $n_{SCID} = 0$, OCC = 2 |
| 1 | 1 layer, port 7, $n_{SCID} = 1$, OCC = 2 | 1 | 2 layers, ports 7-8, $n_{SCID} = 1$, OCC = 2 |
| 2 | 1 layer, port 8, $n_{SCID} = 0$, OCC = 2 | 2 | 2 layers, ports 7-8, $n_{SCID} = 0$, OCC = 4 |
| 3 | 1 layer, port 8, $n_{SCID} = 1$, OCC = 2 | 3 | 2 layers, ports 7-8, $n_{SCID} = 1$, OCC = 4 |
| 4 | 1 layer, port 7, $n_{SCID} = 0$, OCC = 4 | 4 | 2 layers, ports 11/13, $n_{SCID} = 0$, OCC = 4 |
| 5 | 1 layer, port 7, $n_{SCID} = 1$, OCC = 4 | 5 | 2 layers, ports 11/13, $n_{SCID} = 1$, OCC = 4 |
| 6 | 1 layer, port 8, $n_{SCID} = 0$, OCC = 4 | 6 | 3 layers, ports 7-9 |
| 7 | 1 layer, port 8, $n_{SCID} = 1$, OCC = 4 | 7 | 4 layers, ports 7-10 |
| 8 | 1 layer, port 11, $n_{SCID} = 0$, OCC = 4 | 8 | 5 layers, ports 7-11 |
| 9 | 1 layer, port 11, $n_{SCID} = 1$, OCC = 4 | 9 | 6 layers, ports 7-12 |
| 10 | 1 layer, port 13, $n_{SCID} = 0$, OCC = 4 | 10 | 7 layers, ports 7-13 |
| 11 | 1 layer, port 13, $n_{SCID} = 1$, OCC = 4 | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | Reserved | 15 | Reserved |

When table 6 according to the present invention is used, it may further have the following advantages. Since existing DMRS ports 7, 8, 11, and 13 are used, the impact for legacy UE may be minimized. For example, when UE uses Network Assisted Interference Cancellation and Suppression (NAICS) of Rel-12, the UE may operate NAICS assuming the existing antenna port configuration. However, in a state where the antenna port configuration is defined in such a ways as to differ from the existing configuration, when UE performs NAICS, the DMRS detection performance may be degraded. In addition, the information transmitting method is capable of transmitting information regarding antenna ports, scrambling identity, the number of layers, the OCC length, together, referring to table 6, thereby reducing the transmission overhead.

The embodiment explicitly indicates, via a higher layer signaling, a condition as to whether it transmits related information via a 4-bit indicator or a 3-bit indicator, as described in table 6. More specifically, the embodiment may explicitly indicate a condition as to whether messages are transmitted referring to table 3 or 6, via a higher layer signaling. For example, an indicator indicating the condition may be transmitted to UE by an RRC signaling. UE is capable of determining a table to employ, based on the received indicator, and antenna port(s), scrambling identity and layer numbers, based on the analysis related to the table. When receiving a 4-bit indicator, UE is also capable of determining the OCC length.

In addition, with reference to tables 4, 5, and 6, the maximum number of layers to be transmitted to one user in MU-MIMO is maintained up to 2, which is identical to an existing system. Therefore, in a state where a number of reserved bits as described in tables 4, 5, and 6 are maintained, when UE receives DMRS information, it may minimize the decoding error.

Embodiment 2

In the embodiment, a method of indicating the OCC length to switch between OCC=2 and OCC=4 is explained when the increased DMRS information is displayed by maintaining 3 bits. In order to maintain an amount of information of 3 bits, like the existing technology, while the increased DMRS information is displayed, at least one of the following three details is not used or a method of notifying a higher layer signal may be employed.

Antenna port(s)

Scrambling identity ($n_{SCID}$)

Number of layers (rank)

In the embodiment, part of the details described above is not used or the increased DMRS information is maintained in 3 bits via a higher layer signaling. To this end, the following options may be employed.

Option 1: SCID switching is removed from DCI format 2D. The freed up codepoints are used for indication of the additional 2 DMRS ports.

Option 2: Maximum rank is reduced from 8 to 4. The freed up codepoints are used for indication of the additional 2 DMRS ports.

Option 3: Each UE is semi-statically configured with only 2 of 4 DMRS ports. SCID and maximum rank is maintained as in Rel-12

Option 1 is a method that removes an SCID switching function and, instead, displays additional DMRS information. The following table 7 is created by using Option 1.

TABLE 7

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port A | 0 | 2 layers, ports A-B |
| 1 | 1 layer, port B | 1 | 2 layers, ports C-D |
| 2 | 1 layer, port C | 2 | 3 layers, ports 7-9 |
| 3 | 1 layer, port D | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Option 2 is a method that limits the rank information and displays additional DMRS information. The following table 8 is created by using Option 2. With reference to table 8, the method limits the rank to be supported up to 4 and displays additional DMRS information using the remaining resources.

TABLE 8

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port A, $n_{SCID} = 0$ | 0 | 2 layers, ports A-B, $n_{SCID} = 0$ |
| 1 | 1 layer, port A, $n_{SCID} = 1$ | 1 | 2 layers, ports A-B, $n_{SCID} = 1$ |
| 2 | 1 layer, port B, $n_{SCID} = 0$ | 2 | 2 layers, ports C-D, $n_{SCID} = 0$ |
| 3 | 1 layer, port B, $n_{SCID} = 1$ | 3 | 2 layers, ports C-D, $n_{SCID} = 1$ |
| 4 | 1 layer, port C | 4 | 3 layers, ports 7-9 |

TABLE 8-continued

| One Codeword: Codeword 0 enabled, Codeword 1 disabled | | Two Codewords: Codeword 0 enabled, Codeword 1 enabled | |
|---|---|---|---|
| Value | Message | Value | Message |
| 5 | 1 layer, port D | 5 | 4 layers, ports 7-10 |
| 6 | 2 layers, ports 7-8 | 6 | Reserved |
| 7 | Reserved | 7 | Reserved |

With reference to tables 7 and 8, the methods indicate whether the OCC length is OCC=2 or OCC=4, by adding one bit to the DCI and by the higher layer signaling. However, with reference to table 8, OCC=2 and OCC=4 may be indicated by SCID, without the addition of DCI bits or without performing a higher layer signaling. More specifically, when SCID is '0,' it indicates OCC=4, and when SCID is '1,' it indicates OCC=2. An embodiment of this indication method is described referring to the following table 9. In table 9, when SCID is '0,' OCC=4 is expressed and when SCID is '1,' OCC=2 is put in parentheses. However, when it is specified so that: when SCID is '0,' OCC=4 is indicated; and when SCID is '1,' OCC=2 is indicated, the expressions in parentheses may be omitted. Unlike table 8, table 9 supports the SCID switching function via only ports 7 and 8. It may also be set in such a way that the transmission of one codeword is performed using a reserved bit (value 7) and the re-transmission of one codeword is performed in the MU-MIMO transmission. Referring to table 9, the re-transmission of one codeword to UE devices of two users may be performed in the MU-MIMO transmission, using value 6 and value 7 of one codeword. Instead of using the function described above, in the transmission of one codeword, a reserved bit (value 7) may be maintained in table 9, like the function referring to table 8. As described above, the present invention provides a method of displaying increased DMRS information and a method of indicating OCC length. It should be understood that values mapping values to messages in tables may vary according to the embodiments.

TABLE 9

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ (OCC = 4) | 0 | 2 layers, ports 7-8, $n_{SCID} = 0$ (OCC = 4) |
| 1 | 1 layer, port 7, $n_{SCID} = 1$ (OCC = 2) | 1 | 2 layers, ports 7-8, $n_{SCID} = 0$ (OCC = 2) |
| 2 | 1 layer, port 8, $n_{SCID} = 0$ (OCC = 4) | 2 | 2 layers, ports 11/13, $n_{SCID} = 0$ (OCC = 4) |
| 3 | 1 layer, port 8, $n_{SCID} = 1$ (OCC = 2) | 3 | 3 layers, ports 7-9 (OCC = 4) |
| 4 | 1 layer, port 11, $n_{SCID} = 0$ (OCC = 4) | 4 | 4 layers, ports 7-10 (OCC = 4) |
| 5 | 1 layer, port 13, $n_{SCID} = 0$ (OCC = 4) | 5 | Reserved |
| 6 | 2 layers, ports 7-8, $n_{SCID} = 0$ (OCC = 4) | 6 | Reserved |
| 7 | Reserved or [2 layers, ports 11/13, $n_{SCID} = 0$ (OCC = 4)] | 7 | Reserved |

Table 10 describes a method of assuming that value 7 to be used for the re-transmission of one codeword is OCC=2 when one codeword transmission is performed, in comparison with table 9. Unlike table 9, in the re-transmission referring to table 10, MU-MIMO re-transmission using DPS or JT may be performed when COMP is performed using value 6 and value 7 of one codeword. However, unlike table 9, MU-MIMO re-transmission to UE devices of two users cannot be performed at one TP.

TABLE 10

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}$ = 0 (OCC = 4) | 0 | 2 layers, ports 7-8, $n_{SCID}$ = 0 (OCC = 4) |
| 1 | 1 layer, port 7, $n_{SCID}$ = 1 (OCC = 2) | 1 | 2 layers, ports 7-8, $n_{SCID}$ = 1 (OCC = 2) |
| 2 | 1 layer, port 8, $n_{SCID}$ = 0 (OCC = 4) | 2 | 2 layers, ports 11/13, $n_{SCID}$ = 0 (OCC = 4) |
| 3 | 1 layer, port 8, $n_{SCID}$ = 1 (OCC = 2) | 3 | 3 layers, ports 7-9 |
| 4 | 1 layer, port 11. $n_{SCID}$ = 0 (OCC = 4) | 4 | 4 layers, ports 7-10 |
| 5 | 1 layer, port 13, $n_{SCID}$ = 0 (OCC = 4) | 5 | Reserved |
| 6 | 2 layers, ports 7-8, $n_{SCID}$ = 1 (OCC = 2) | 6 | Reserved |
| 7 | Reserved or [2 layers, ports 11/13, $n_{SCID}$ = 0 (OCC = 4)] | 7 | Reserved |

Option 3 is a method that configures port information and OCC length indication by using RRC. For example, after UE devices in a cell are divided into two groups, one group is allocated DMRS ports A and B and the other group is allocated DMRS ports C and D, using RRC. In this case, OCC lengths may also be additionally indicated. For example, UE devices allocated DMRS ports A and B may be set to use OCC=2, and UE devices allocated DMRS ports C and D may be set to use OCC=4. When employing the following table 11, the method may additionally set DMRS ports while using existing DCI bits and may also indicate the OCC length. However, it is disadvantageous because UE devices in a cell may be divided into two or more groups in order to additionally indicate an OCC length.

TABLE 11

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port A or C, $n_{SCID}$ = 0 (Ports configured by RRC) | 0 | 2 layers, ports A-B or C-D, $n_{SCID}$ = 0 (Ports configured by RRC) |
| 1 | 1 layer, port A or C, $n_{SCID}$ = 1 (Ports configured by RRC) | 1 | 2 layers, ports A-B or C-D, $n_{SCID}$ = 1 (Ports configured by RRC) |
| 2 | 1 layer, port B or D, $n_{SCID}$ = 0 (Ports configured by RRC) | 2 | 3 layers, ports 7-9 |
| 3 | 1 layer, port B or D, $n_{SCID}$ = 1 (Ports configured by RRC) | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

In order to resolve the disadvantage that UE devices in a cell may be divided into two or more groups in order to indicate an OCC length as described above referring to table 11, an SCID using method is described in detail with reference to the following tables 12 and 13, like the operations referring to tables 9 and 10. When SCID is '0,' it indicates OCC=4, and when SCID is '1,' it indicates OCC=2. In tables 12 and 13, when SCID is '0,' OCC=4 is expressed and when SCID is '1,' OCC=2 is put in parentheses. However, when it is specified so that: when SCID is '0,' OCC=4 is indicated; and when SCID is '1,' OCC=2 is indicated, the expressions in parentheses may be omitted. Table 12 is a table for UE group 1 which uses ports 7 and 8 in supporting MU-MIMO. Table 13 is a table for UE group 2 which uses ports 11 and 13 in supporting MU-MIMO. Tables 12 and 13 support the SCID switching function via only ports 7 and 8. When one codeword is transmitted, the re-transmission is set to be performed using a reserved bit (value 7) in MU-MIMO transmission. Referring to tables 12 and 13, the re-transmission of one codeword to UE devices of two users in different groups may be performed in MU-MIMO transmission, using value 7 of one codeword. Instead of using the function described above, in the transmission of one codeword, a reserved bit (value 7) may also be maintained. As described above, the present invention provides a method of displaying increased DMRS information and a method of indicating OCC length. It should be understood that values mapping values to messages in tables may vary according to the embodiments. Table 12 is related to UE group 1, and Table 13 is related to UE group 2.

TABLE 12

| One Codeword: Codeword 0 enabled, Codeword 2 disabled | | Two Codewords: Codeword 0 enabled, Codeword 1 enabled | |
|---|---|---|---|
| Value | Message | Value | Message |
| 0 | 1 layer, port 7, $n_{SCID}$ = 0 (OCC = 4) | 0 | 2 layers, ports 7-8, $n_{SCID}$ = 0 (OCC = 4) |
| 1 | 1 layer, port 7, $n_{SCID}$ = 1 (OCC = 2) | 1 | 2 layers, ports 7-8, $n_{SCID}$ = 1 (OCC = 2) |
| 2 | 1 layer, port 8, $n_{SCID}$ = 0 (OCC = 4) | 2 | 3 layers, ports 7-9 |
| 3 | 1 layer, port 8, $n_{SCID}$ = 1 (OCC = 2) | 3 | 4 layers, ports 7-10 |
| 4 | 2 layers, ports 7-8, $n_{SCID}$ = 1 (OCC = 2) | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved or [2 layers, ports 7-8, $n_{SCID}$ = 0 (OCC = 4)] | 7 | 8 layers, ports 7-14 |

TABLE 13

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 11, $n_{SCID}$ = 0 (OCC = 4) | 0 | 2 layers, ports 11/13, $n_{SCID}$ = 0 (OCC = 4) |
| 1 | 1 layer, port 7, $n_{SCID}$ = 1 (OCC = 2) | 1 | 2 layers, ports 7-8, $n_{SCID}$ = 1 (OCC = 2) |
| 2 | 1 layer, port 13, $n_{SCID}$ = 0 (OCC = 4) | 2 | 3 layers, ports 7-9 |
| 3 | 1 layer, port 8, $n_{SCID}$ = 1 (OCC = 2) | 3 | 4 layers, ports 7-10 |
| 4 | 2 layers, ports 7-8, $n_{SCID}$ = 1 (OCC = 2) | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved or [2 layers, ports 11-13, $n_{SCID}$ = 0 (OCC = 4)] | 7 | 8 layers, ports 7-14 |

Embodiment 3

In the embodiment, a method of switching between OCC=4 and OCC=2 using PDSCH RE mapping and Quasi-Co-Location Indicator (PQI) field is described. The DCI format 2D uses a 2-bit PQI field to perform CoMP and to use Quasi Co-Location (QCL) information. The QCl field is described in the following table 14. A parameter set specified in the QCL field is described as follows. The parameter set is configured via the higher layer signaling. UE performs the PDSCH decoding, assuming PDSCH RE mapping, using a parameter set indicated by the QCL field.

<Parameter Set Configured in Higher Layer>
crs-PortsCount-r11.
crs-FreqShift-r11.
mbsfn-SubframeConfigList-r11.
csi-RS-ConfigZPId-r11.
pdsch-Start-r11.
qcl-CSI-RS-ConfigNZPId-r11.

Table 4 shows PDSCH RE Mapping and Quasi-Co-Location indicator in the DCI format 2D.

| Value of 'PDSCH RE Mapping and Quasi-Co-Location indicator' field | Description |
|---|---|
| '00' | Parameter set 1 configured by higher layers |
| '01' | Parameter set 2 configured by higher layers |
| '10' | Parameter set 3 configured by higher layers |
| '11' | Parameter set 4 configured by higher layers |

When the QCL field described in table 14 is contained in TM10 using the DCI format 2D or in DCI format 2X which will be newly defined later, OCC=4/OCC=2 may be indicated and the indication may be determined by the method shown in the following FIG. 3.

Figure 3:
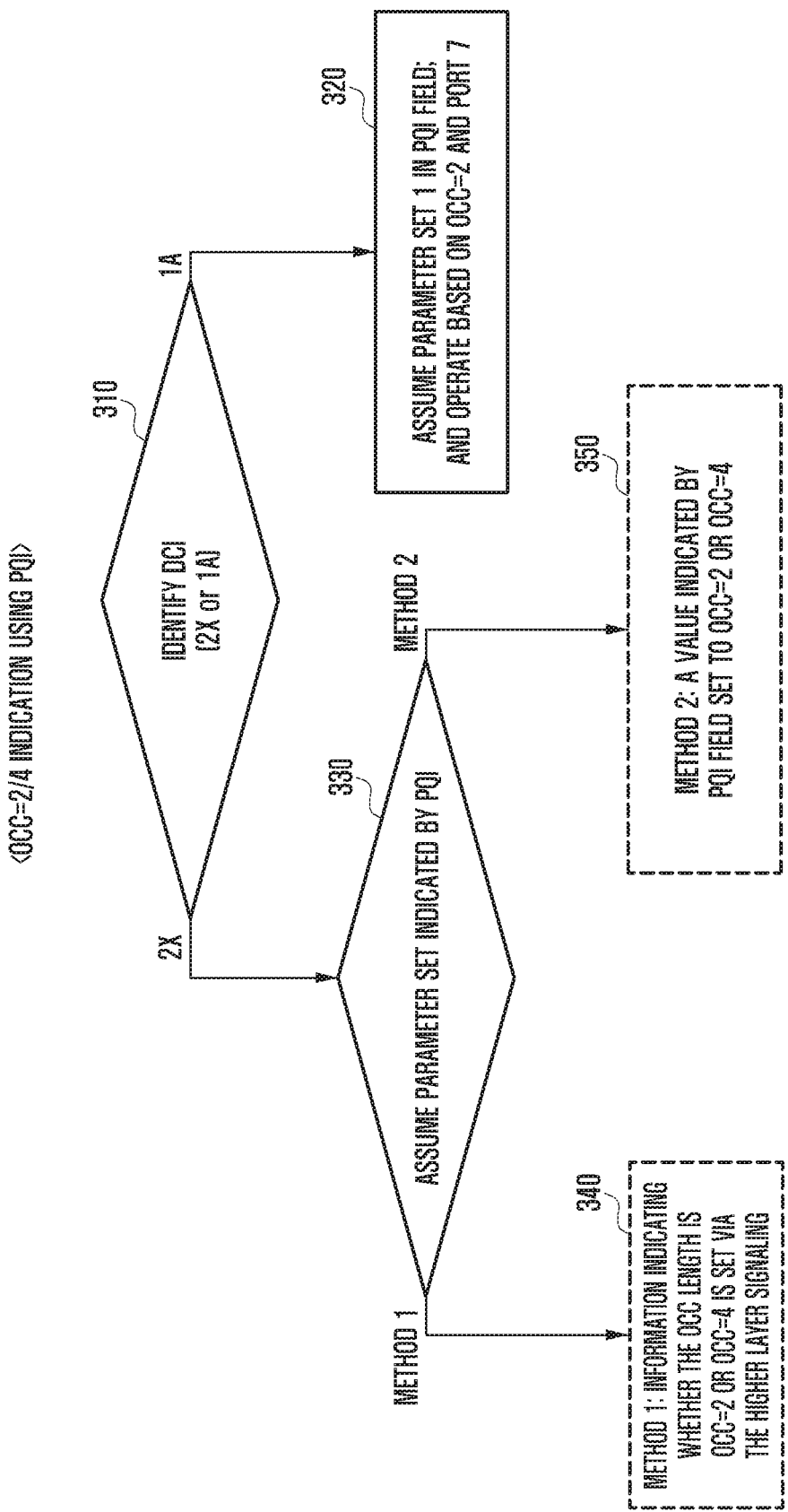
FIG. 3 is a flowchart that describes a method of transmitting DMRS information according to a first embodiment of the present disclosure.

FIG. 3 is a flowchart that describes a method of transmitting DMRS information according to a first embodiment of the present disclosure. As shown in FIG. 3, 2X represents the current DCI format 2D or a DCI format which will be newly defined later.

With reference to FIG. 3, UE receives a DCI from an eNB and identifies the format of the received DCI in operation 310. More specifically, UE determines whether the received DCI is 2X or 1A in operation 310.

When UE ascertains that the received DCI is 1A in operation 310, it proceeds with operation 320. More specifically, when UE falls back from the DCI format 2X to 1A, the OCC length may be set to 2. In this case, UE increases the channel estimation performance using OCC=2 in Fallback mode and thus operates more stably.

On the other hand, when UE ascertains that the received DCI is 2X in operation 310, it proceeds with operation 330. More specifically, when DCI has been set to 2X, UE assumes a parameter set indicated by PQI. In this case, OCC=2/4 indication may be determined by one of the following two methods, as in operations 340 and 350.

Method 1 adds the following parameter to a parameter set configured via the higher layer signaling.

Method 1: Adding a Parameter Set Configured Via Higher Layer

OCC-Length-indication

The OCC-Length-indication is a parameter that may be set, as 1 bit, to RRC, indicating whether the OCC length is 2 or 4. Method 1 can dynamically set parameters, configured via the higher layer signaling, to UE.

Method 2 sets a value indicated by the PQI field to OCC=2 or OCC=4.

Method 2: Setting a Value Indicated by the PQI Field to OCC=2 or OCC=4

An embodiment of Method 2 is described below, referring to the following table 15. Method 2 is a method that maps OCC lengths to values indicated by the PQI field as described in table 15. In table 15, PQI field "00" is set to OCC=4. This allows UE to use OCC=2, assuming that PQP field is "00," when UE falls back to 1A as shown in FIG. 3. Although table 15 is described in such a way that PQI fields "01, 10, 11" are mapped to OCC=2, it should be understood that the PQI fields may also be mapped to OCC=4 according to conditions.

TABLE 15

| Value of 'PDSCH RE Mapping and Quasi-Co-Location indicator' field | OCC length indication | Description |
| --- | --- | --- |
| '00' | OCC = 4 | Parameter set 1 configured by higher layers |
| '01' | OCC = 2 | Parameter set 2 configured by higher layers |
| '10' | OCC = 2 | Parameter set 3 configured by higher layers |
| '11' | OCC = 2 | Parameter set 4 configured by higher layers |

Embodiment 3 describes a method of setting OCC=2/4 indication which can be used in TM including a PQI field. When OCC=2/4 indication needs to be set in TM which does not use a PQI, it may employ the OCC-Length-indication configured via Higher layer as in Method 1. When UE falls back to 1A as described above referring to FIG. 3, OCC=2 may be assumed so that the UE can operate stably. Operations of Method 2 which can be additionally configured are described referring to the following FIG. 4.

Figure 4:
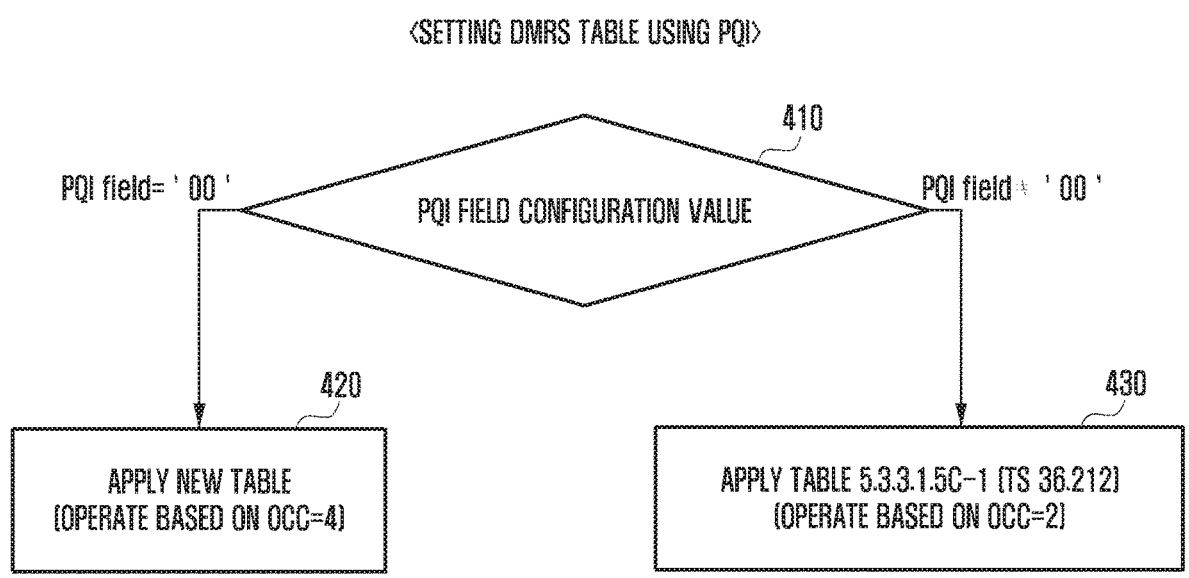
FIG. 4 is a flowchart that describes a method of transmitting DMRS information according to a second embodiment of the present disclosure.

FIG. 4 is a flowchart that describes a method of transmitting DMRS information according to a second embodiment of the present disclosure.

More specifically, when new DMRS tables are defined as in tables 7, 8, and 11, and OCC=4 is assumed in supporting MU-MIMO, switching between OCC=2 and 4 may be performed as follows.

UE identifies a configuration value of the received PQI field in operation 410. In the embodiment, UE identifies a PQI field referring to table 14 or 15. When UE ascertains that PQI field='00' is set, it ascertains that OCC=4 is supported and thus employs a new DMRS table assuming OCC=4 in supporting MU-MIMO in operation 430.

On the other hand, when UE ascertains that PQI field≠'00' is set, it ascertains that OCC=2 is supported and thus employs an existing DMRS table (Table 5.3.3.1.5C, TS 36.212) assuming OCC=2 in supporting MU-MIMO in operation 420. For example, when PQI field='00' is set, the following table 16 may be used. Table 16 is a detailed embodiment of table 7.

TABLE 16

| One Codeword: Codeword 0 enabled, Codeword 1 disabled | | Two Codewords: Codeword 0 enabled, Codeword 1 enabled | |
| --- | --- | --- | --- |
| Value | Message | Value | Message |
| 0 | 1 layer, port 7 (OCC = 4) | 0 | 2 layers, ports 7/8 (OCC = 4) |
| 1 | 1 layer, port 8 (OCC = 4) | 1 | 2 layers, ports 11/13 (OCC = 4) |
| 2 | 1 layer, port 11 (OCC = 4) | 2 | 3 layers, ports 7-9 (OCC = 2) |
| 3 | 1 layer, port 13 (OCC = 4) | 3 | 4 layers, ports 7-10 (OCC = 2) |
| 4 | 2 layers, ports 7-8 (OCC = 2) | 4 | 5 layers, ports 7-11 (OCC = 4) |
| 5 | 3 layers, ports 7-9 (OCC = 2) | 5 | 6 layers, ports 7-12 (OCC = 4) |
| 6 | 4 layers, ports 7-10 (OCC = 2) | 6 | 7 layers, ports 7-13 (OCC = 4) |
| 7 | Reserved | 7 | 8 layers, ports 7-14 (OCC = 4) |

When the number of orthogonal transport layers for MU-MIMO is increased from the existing 2 to 4 or more, through the DMRS enhancement, in an FD-MIMO system according to embodiment of the present invention, Embodiments 1 and 2 describe, referring to tables 4 to 9, a method that informs UE of an OCC length so that the UE can switch between OCC=2 and OCC=4 according to its conditions. According to embodiments of the present invention, when UE receives an indication for the OCC length, it operates as follows.

Figure 5:
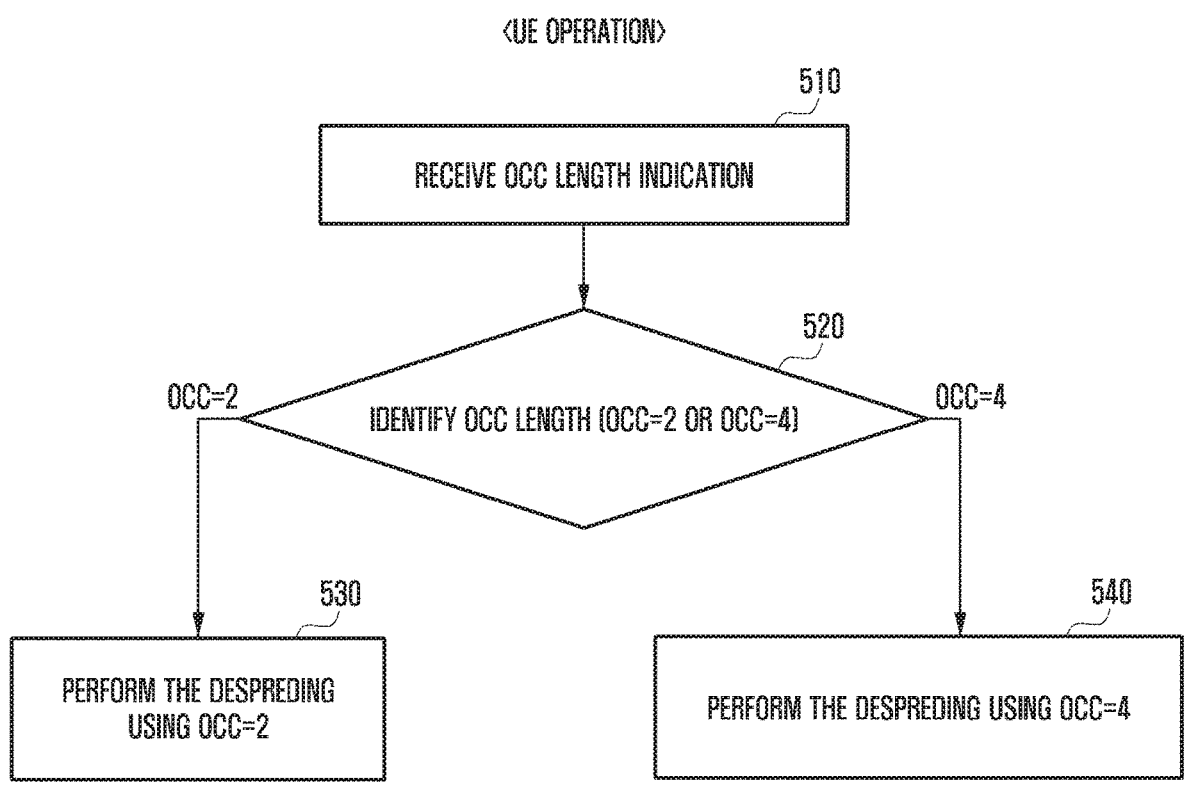
FIG. 5 is a flowchart that describes a method of transmitting DMRS information according to a third embodiment of the present disclosure.

FIG. 5 is a flowchart that describes a method of transmitting DMRS information according to a third embodiment of the present disclosure.

With reference to FIG. 5, UE receives an indication for an OCC length from the eNB in operation 510. More specifically, when UE displays DMRS information using 4 bits as in Embodiment 1, it is capable of dynamically indicating information regarding the OCC length (refer to tables 4, 5, and 6). In this case, UE receives control information from the eNB and identifies the OCC length based on the 4-bit indicator indicating DMRS information contained in the control information. When UE displays DMRS information using 3 bits as in Embodiment 2, it may employ methods that indicate whether information regarding an OCC length is OCC=2 or OCC=4, by adding one bit to the DCI and by the higher layer signaling. When the UE employs a method of informing port information using RRC referring to table 9, it may also receive information regarding the OCC length. Like Embodiment 3, information regarding an OCC length may be notified via the higher layer signaling by using PQI or mapping the OCC length to a value indicated by a QI field.

UE determines whether the OCC length is OCC=2 or OCC=4 via the indication of the OCC length in operation 520. When UE ascertains that the OCC length is OCC=2 in operation 520, it performs the OCC despreading using OCC=2 in operation 530. On the other hand, when UE ascertains that the OCC length is OCC=4 in operation 520, it performs the OCC despreading using OCC=4 in operation 540.

Figure 6:
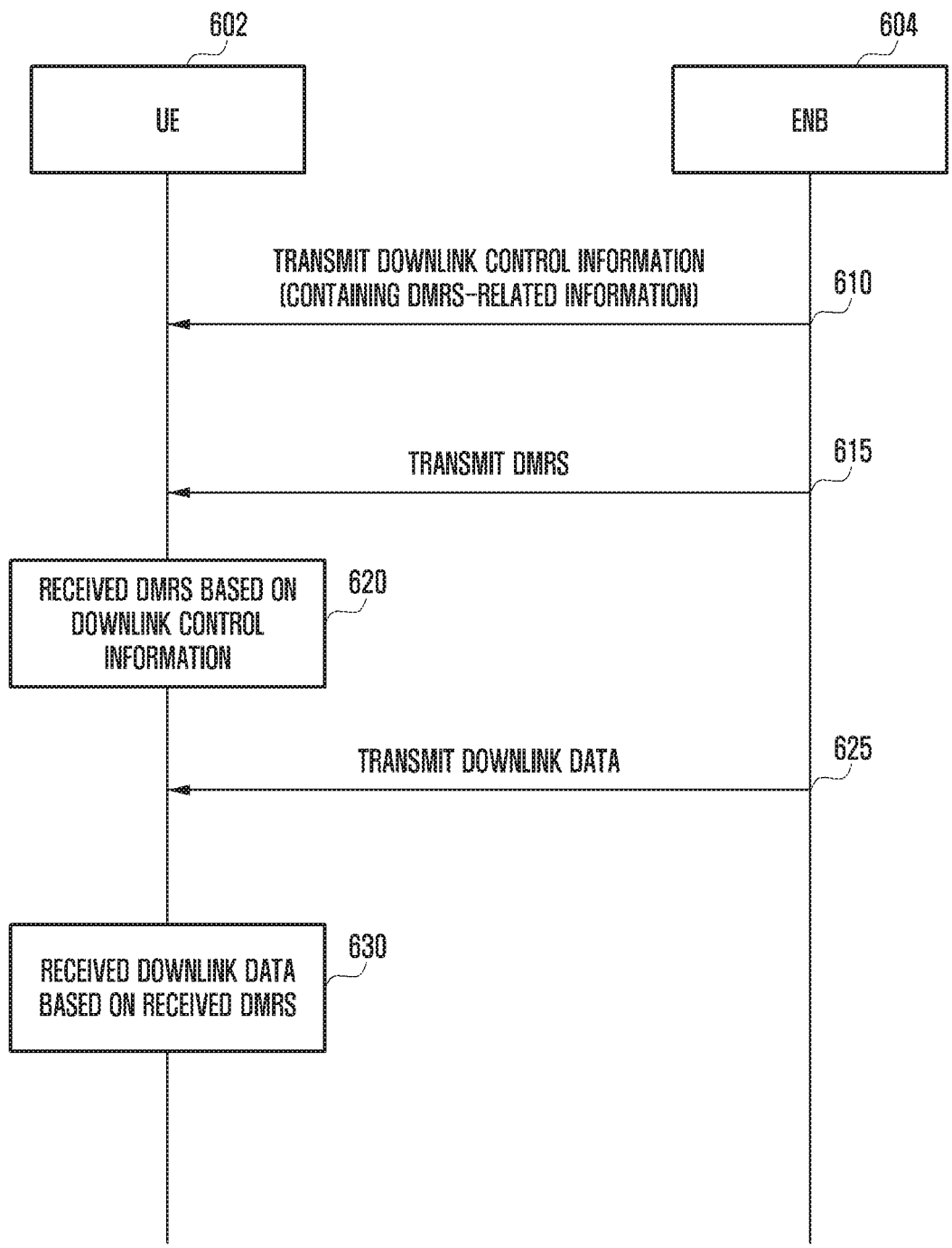
FIG. 6 is a flow diagram that describes operations of an eNB and UE according to embodiments of the present disclosure.

FIG. 6 is a flow diagram that describes operations of an eNB and UE according to embodiments of the present disclosure.

With reference to FIG. 6, UE 602 is capable of transmitting/receiving signals to/from an eNB 604.

The eNB is capable of transmitting downlink control information (DCI) to the UE in operation 610. The DCI may contain DMRS-related information. The DMRS-related information may be transmitted according to embodiments described above. The DMRS-related information may contain an indicator indicating the OCC length.

The eNB is capable of transmitting the DMRS to the UE in operation 615. The DMRS may be transmitted in various modes according to the configurations of systems.

UE is capable of receiving the DMRS based on information received through the DCI in operation 620. More specifically, UE is capable of performing the OCC despreding based on the indicator indicating the OCC length.

The eNB is capable of transmitting downlink data to the UE in operation 625.

The UE is capable of receiving the downlink data based on the received DMRS and DCI in operation 630.

In the embodiment, the DCI, DMRS and downlink data may be transmitted via the same sub-frame or different sub-frames.

When the eNB 604 transmits DMRS-related information to the UE 602, UE 602 receives the DMRS-related information and estimates channel information. UE 602 also receives downlink data from the eNB 604 based on the channel information.

Figure 7:
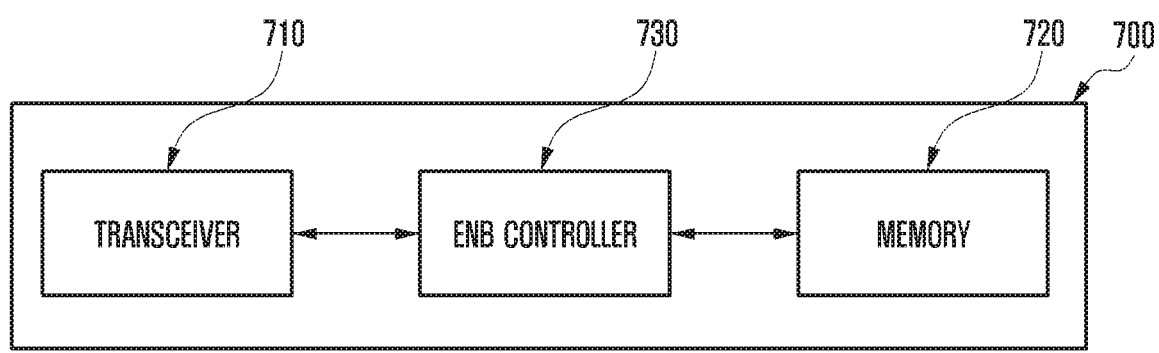
FIG. 7 is a block diagram of an eNB according to embodiments of the present disclosure.

FIG. 7 is a block diagram of an eNB according to embodiments of the present disclosure.

With reference to FIG. 7, the eNB 700 is capable of including a transceiver 710, a memory 720 and a controller 730.

The transceiver 710 is capable of performing the transmission of signals. More specifically, the transceiver 710 is capable of transmitting/receiving signals to/from UE and other network nodes under the control of the controller 730.

The memory 720 is capable of storing information related to the eNB 700 and information transmitted/received via the transceiver 710. The memory 720 may also store information for controlling the eNB and the UE.

The controller 730 is capable of controlling the entire operation of the eNB 700, including the transceiver 710 and the memory 720. The controller 730 is also capable of controlling the operations of eNBs in the embodiments described above. For example, the eNB is capable of transmitting DCI, DMRS and downlink data to the UE under the control of the controller 730. More specifically, the eNB is capable of transmitting DMRS-related information to the UE via DCI, and also informing the UE of the OCC length. It should be understood that the controller may also control eNBs to perform corresponding operations in other embodiments.

Figure 8:
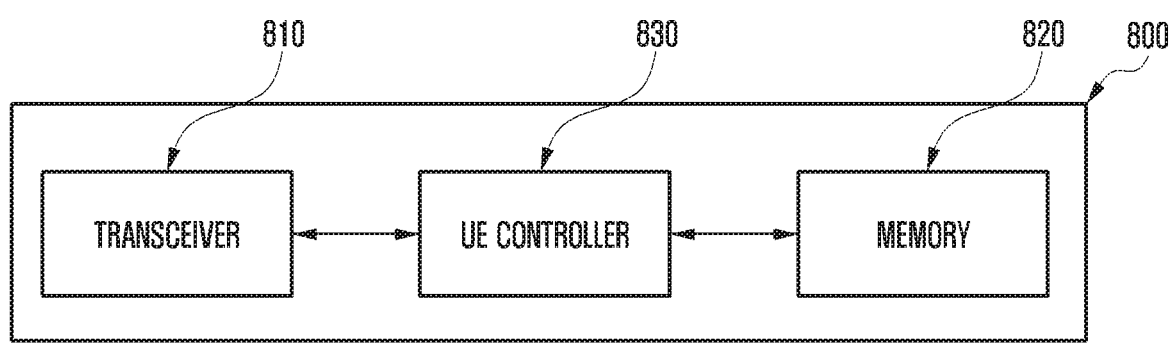
FIG. 8 is a block diagram of UE according to embodiments of the present disclosure.

FIG. 8 is a block diagram of UE according to embodiments of the present disclosure.

With reference to FIG. 8, the UE 800 is capable of including a transceiver 810, a memory 820 and a controller 830.

The transceiver 810 is capable of performing the transmission of signals. More specifically, the transceiver 810 is capable of transmitting/receiving signals to/from an eNB, another UE and other network nodes under the control of the controller 830.

The memory 820 is capable of storing information related to the UE 800 and information transmitted/received via the transceiver 810. The memory 820 may also store information for controlling the UE.

The controller 830 is capable of controlling the entire operation of the UE 800, including the transceiver 810 and the memory 820. The controller 830 is also capable of controlling the operations of UE in the embodiments described above. For example, UE is capable of receiving DCI, DMRS and downlink data from the eNB under the control of the controller 830. More specifically, UE is capable of receiving DMRS-related information from the eNB via DCI, and also obtaining information related to the OCC length. It should be understood that the controller may also control UE to perform corresponding operations in other embodiments.

As described above, in a mobile communication system according to embodiments of the present invention, the eNB transmits information related to a reference signal to UE, and the UE receives the reference signal based on the received information, thereby improving the performance of channel estimation. The eNB transmits information related to the OCC length based on control information to UE, so that the UE can use the OCC length variably and improve the transmission capability. It should be understood that the embodiments of the present disclosure are not limited to effects described above.

The embodiments of the present invention described in the description and drawings along with particular terms are merely provided to assist in a comprehensive understanding of the invention and are not suggestive of limitation. Although embodiments of the invention have been described in detail above, it should be understood that many variations and modifications of the basic inventive concept herein described, which may be apparent to those skilled in the art, will still fall within the spirit and scope of the embodiments of the invention.

What is claimed is:

1. A method for transmitting and receiving a signal by a terminal in a mobile communication system, the method comprising:
   receiving configuration information of a demodulation reference signal (DMRS) on higher layer signaling;
   receiving control information including DMRS information;
   identifying information of an orthogonal cover code (OCC) length, a number of layers, and an antenna port associated with the DMRS based on the DMRS information; and
   receiving the DMRS based on the control information,
   wherein a length of the DMRS information is indicated as one of 3 bits or 4 bits based on the configuration information of the DMRS, and
   wherein in a case that the length of the DMRS information is 4 bits and two codewords are enabled and a value of the DMRS information indicates 3 or 4 layers, the OCC length is 2.

2. The method of claim 1, wherein the OCC length is identified as one of 2 or 4 in a case that the length of the DMRS information is 4 bits.

3. The method of claim 1, wherein a scrambling identity is further indicated by the DMRS information in a case that the DMRS information indicates that up to 2 layers are used and the length of the DMRS information is 4 bits.

4. The method of claim 1,
   wherein the DMRS information is identified based on the following table,

| One codeword Codeword 0 enabled, Codeword 1 disabled | | Two codewords Codeword 0 enabled, Codeword 1 enabled | |
|---|---|---|---|
| Value of DMRS information | Message (indicated information) | Value of DMRS information | Message (indicated information) |
| 0 | 1 layer, port 7, $n_{SCID} = 0$ (OCC = 2) | 0 | 2 layer, port 7-8, $n_{SCID} = 0$ (OCC = 2) |
| 1 | 1 layer, port 7, $n_{SCID} = 1$ (OCC = 2) | 1 | 2 layer, port 7-8, $n_{SCID} = 1$ (OCC = 2) |
| 2 | 1 layer, port 8, $n_{SCID} = 0$ (OCC = 2) | 2 | 2 layer, port 7-8, $n_{SCID} = 0$ (OCC = 4) |
| 3 | 1 layer, port 8, $n_{SCID} = 1$ (OCC = 2) | 3 | 2 layer, port 7-8, $n_{SCID} = 1$ (OCC = 4) |
| 4 | 1 layer, port 7, $n_{SCID} = 0$ (OCC = 4) | 4 | 2 layer, port 11, 13, $n_{SCID} = 0$ (OCC = 4) |
| 5 | 1 layer, port 7, $n_{SCID} = 1$ (OCC = 4) | 5 | 2 layer, port 11, 13, $n_{SCID} = 1$ (OCC = 4) |
| 6 | 1 layer, port 8, $n_{SCID} = 0$ (OCC = 4) | 6 | 3 layer, port 7-9 (OCC = 2) |
| 7 | 1 layer, port 8, $n_{SCID} = 1$ (OCC = 4) | 7 | 4 layer, port 7-10 (OCC = 2) |
| 8 | 1 layer, port 11, $n_{SCID} = 0$ (OCC = 4) | 8 | 5 layer, port 7-11 |
| 9 | 1 layer, port 11, $n_{SCID} = 1$ (OCC = 4) | 9 | 6 layer, port 7-12 |
| 10 | 1 layer, port 13, $n_{SCID} = 0$ (OCC = 4) | 10 | 7 layers, ports 7-13 |
| 11 | 1 layer, port 13, $n_{SCID} = 1$ (OCC = 4) | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | Reserved | 15 | Reserved | and wherein $n_{SCID}$ is a scrambling identity.

5. A method for transmitting and receiving a signal by a base station in a mobile communication system, the method comprising:

transmitting configuration information of a demodulation reference signal (DMRS) on higher layer signaling;

transmitting control information including DMRS information; and transmitting the DMRS based on the control information, wherein information of an orthogonal cover code (OCC) length, a number of layers, and an antenna port associated with the DMRS are identified based on the DMRS information, wherein a length of the DMRS information is indicated as one of 3 bits or 4 bits based on the configuration information of the DMRS, and wherein in a case that the length of the DMRS information is 4 bits and two codewords are enabled and a value of the DMRS information indicates 3 or 4 layers, the OCC length is 2.

6. The method of claim 5, wherein the OCC length is identified as one of 2 or 4 in a case that the length of the DMRS information is 4 bits.

7. The method of claim 5, wherein a scrambling identity is identified based on the DMRS information in a case that the DMRS information indicates that up to 2 layers are used and the length of the DMRS information is 4 bits.

8. The method of claim 5, wherein the DMRS information is identified based on the following table,

| One codeword Codeword 0 enabled, Codeword 1 disabled | | Two codewords Codeword 0 enabled, Codeword 1 enabled | |
|---|---|---|---|
| Value of DMRS information | Message (indicated information) | Value of DMRS information | Message (indicated information) |
| 0 | 1 layer, port 7, $n_{SCID} = 0$ (OCC = 2) | 0 | 2 layer, port 7-8, $n_{SCID} = 0$ (OCC = 2) |
| 1 | 1 layer, port 7, $n_{SCID} = 1$ (OCC = 2) | 1 | 2 layer, port 7-8, $n_{SCID} = 1$ (OCC = 2) |
| 2 | 1 layer, port 8, $n_{SCID} = 0$ (OCC = 2) | 2 | 2 layer, port 7-8, $n_{SCID} = 0$ (OCC = 4) |
| 3 | 1 layer, port 8, $n_{SCID} = 1$ (OCC = 2) | 3 | 2 layer, port 7-8, $n_{SCID} = 1$ (OCC = 4) |
| 4 | 1 layer, port 7, $n_{SCID} = 0$ (OCC = 4) | 4 | 2 layer, port 11, 13, $n_{SCID} = 0$ (OCC = 4) |
| 5 | 1 layer, port 7, $n_{SCID} = 1$ (OCC = 4) | 5 | 2 layer, port 11, 13, $n_{SCID} = 1$ (OCC = 4) |
| 6 | 1 layer, port 8, $n_{SCID} = 0$ (OCC = 4) | 6 | 3 layer, port 7-9 (OCC = 2) |
| 7 | 1 layer, port 8, $n_{SCID} = 1$ (OCC = 4) | 7 | 4 layer, port 7-10 (OCC = 2) |
| 8 | 1 layer, port 11, $n_{SCID} = 0$ (OCC = 4) | 8 | 5 layer, port 7-11 |
| 9 | 1 layer, port 11, $n_{SCID} = 1$ (OCC = 4) | 9 | 6 layer, port 7-12 |
| 10 | 1 layer, port 13, $n_{SCID} = 0$ (OCC = 4) | 10 | 7 layers, ports 7-13 |
| 11 | 1 layer, port 13, $n_{SCID} = 1$ (OCC = 4) | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | Reserved | 15 | Reserved | and wherein $n_{SCID}$ is a scrambling identity.

9. A terminal in a mobile communication system, the terminal comprising:

a transceiver for transmitting and receiving a signal; and a controller coupled with the transceiver and configured to:

receive configuration information of a demodulation reference signal (DMRS) on higher layer signaling,
receive control information including DMRS information,
identify information of an orthogonal cover code (OCC) length, a number of layers, antenna port associated with the DMRS based on the DMRS information, and
receive the DMRS based on the control information,
wherein a length of the DMRS information is indicated as one of 3 bits or 4 bits based on the configuration information of the DMRS, and
wherein in a case that the length of the DMRS information is 4 bits and two codewords are enabled and a value of the DMRS information indicates 3 or 4 layers, the OCC length is 2.

10. The terminal of claim 9, wherein the OCC length is identified as one of 2 or 4 in a case that the length of the DMRS information is 4 bits.

11. The terminal of claim 9, wherein a scrambling identity is further indicated by the DMRS information in a case that the DMRS information indicates that up to 2 layers are used and the length of the DMRS information is 4 bits.

12. The terminal of claim 9,
wherein the DMRS information is identified based on the following table, a transceiver for transmitting and receiving a signal; and
a controller coupled with the transceiver and configured to:
transmit configuration information of a demodulation reference signal (DMRS) on higher layer signaling,
transmit control information including DMRS information, and
transmit the DMRS based on the control information,
wherein information of an orthogonal cover code (OCC) length, a number of layers, and an antenna port associated with the DMRS are identified based on the DMRS information,
wherein a length of the DMRS information is indicated as one of 3 bits or 4 bits based on the configuration information of the DMRS, and
wherein in a case that the length of the DMRS information is 4 bits and two codewords are enabled and a value of the DMRS information indicates 3 or 4 layers, the OCC length is 2.

14. The base station of claim 13, wherein the OCC length is identified as one of 2 or 4 in a case that the length of the DMRS information is 4 bits.

15. The base station of claim 13, wherein a scrambling identity is identified based on the DMRS information in a

| One codeword Codeword 0 enabled, Codeword 1 disabled | | Two codewords Codeword 0 enabled, Codeword 1 enabled | |
| --- | --- | --- | --- |
| Value of DMRS information | Message (indicated information) | Value of DMRS information | Message (indicated information) |
| 0 | 1 layer, port 7, $n_{SCID} = 0$ (OCC = 2) | 0 | 2 layer, port 7-8, $n_{SCID} = 0$ (OCC = 2) |
| 1 | 1 layer, port 7, $n_{SCID} = 1$ (OCC = 2) | 1 | 2 layer, port 7-8, $n_{SCID} = 1$ (OCC = 2) |
| 2 | 1 layer, port 8, $n_{SCID} = 0$ (OCC = 2) | 2 | 2 layer, port 7-8, $n_{SCID} = 0$ (OCC = 4) |
| 3 | 1 layer, port 8, $n_{SCID} = 1$ (OCC = 2) | 3 | 2 layer, port 7-8, $n_{SCID} = 1$ (OCC = 4) |
| 4 | 1 layer, port 7, $n_{SCID} = 0$ (OCC = 4) | 4 | 2 layer, port 11, 13, $n_{SCID} = 0$ (OCC = 4) |
| 5 | 1 layer, port 7, $n_{SCID} = 1$ (OCC = 4) | 5 | 2 layer, port 11, 13, $n_{SCID} = 1$ (OCC = 4) |
| 6 | 1 layer, port 8, $n_{SCID} = 0$ (OCC = 4) | 6 | 3 layer, port 7-9 (OCC = 2) |
| 7 | 1 layer, port 8, $n_{SCID} = 1$ (OCC = 4) | 7 | 4 layer, port 7-10 (OCC = 2) |
| 8 | 1 layer, port 11, $n_{SCID} = 0$ (OCC = 4) | 8 | 5 layer, port 7-11 |
| 9 | 1 layer, port 11, $n_{SCID} = 1$ (OCC = 4) | 9 | 6 layer, port 7-12 |
| 10 | 1 layer, port 13, $n_{SCID} = 0$ (OCC = 4) | 10 | 7 layers, ports 7-13 |
| 11 | 1 layer, port 13, $n_{SCID} = 1$ (OCC = 4) | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | Reserved | 15 | Reserved | and
wherein $n_{SCID}$ is a scrambling identity.

13. A base station in a mobile communication system, the base station comprising:

case that the DMRS information indicates that up to 2 layers are used and the length of the DMRS information is 4 bits.

16. The base station of claim 13,
wherein the DMRS information is identified based on the following table,

| One codeword Codeword 0 enabled, Codeword 1 disabled | | Two codewords Codeword 0 enabled, Codeword 1 enabled | |
| --- | --- | --- | --- |
| Value of DMRS information | Message (indicated information) | Value of DMRS information | Message (indicated information) |
| 0 | 1 layer, port 7, $n_{SCID} = 0$ (OCC = 2) | 0 | 2 layer, port 7-8, $n_{SCID} = 0$ (OCC = 2) |
| 1 | 1 layer, port 7, $n_{SCID} = 1$ (OCC = 2) | 1 | 2 layer, port 7-8, $n_{SCID} = 1$ (OCC = 2) |
| 2 | 1 layer, port 8, $n_{SCID} = 0$ (OCC = 2) | 2 | 2 layer, port 7-8, $n_{SCID} = 0$ (OCC = 4) |
| 3 | 1 layer, port 8, $n_{SCID} = 1$ (OCC = 2) | 3 | 2 layer, port 7-8, $n_{SCID} = 1$ (OCC = 4) |
| 4 | 1 layer, port 7, $n_{SCID} = 0$ (OCC = 4) | 4 | 2 layer, port 11, 13, $n_{SCID} = 0$ (OCC = 4) |

-continued

| One codeword Codeword 0 enabled, Codeword 1 disabled | | Two codewords Codeword 0 enabled, Codeword 1 enabled | |
|---|---|---|---|
| Value of DMRS information | Message (indicated information) | Value of DMRS information | Message (indicated information) |
| 5 | 1 layer, port 7, $n_{SCID}$ = 1 (OCC = 4) | 5 | 2 layer, port 11, 13, $n_{SCID}$ = 1 (OCC = 4) |
| 6 | 1 layer, port 8, $n_{SCID}$ = 0 (OCC = 4) | 6 | 3 layer, port 7-9 |
| 7 | 1 layer, port 8, $n_{SCID}$ = 1 (OCC = 4) | 7 | 4 layer, port 7-10 |
| 8 | 1 layer, port 11, $n_{SCID}$ = 0 (OCC = 4) | 8 | 5 layer, port 7-11 |
| 9 | 1 layer, port 11, $n_{SCID}$ = 1 (OCC = 4) | 9 | 6 layer, port 7-12 |
| 10 | 1 layer, port 13, $n_{SCID}$ = 0 (OCC = 4) | 10 | 7 layers, ports 7-13 |
| 11 | 1 layer, port 13, $n_{SCID}$ = 1 (OCC = 4) | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | Reserved | 15 | Reserved | and
wherein $n_{SCID}$ is a scrambling identity.

* * * * *